(12) United States Patent
Starr et al.

(10) Patent No.: US 11,743,974 B2
(45) Date of Patent: Aug. 29, 2023

(54) MODULAR PLATFORM ELECTRIC TRENCH HEATER

(71) Applicant: The Marley Company LLC, Burr Ridge, IL (US)

(72) Inventors: Brett Starr, Michigan City, IN (US);
Brian Lynn, Michigan City, IN (US);
Andrew J. Martin, Chicago, IL (US);
Patrick A. von zur Muehlen, Valparaiso, IN (US)

(73) Assignee: THE MARLEY COMPANY LLC, Burr Ridge, IL (US)

( * ) Notice: Subject to any disclaimer, the term of this patent is extended or adjusted under 35 U.S.C. 154(b) by 693 days.

(21) Appl. No.: 16/797,579

(22) Filed: Feb. 21, 2020

(65) Prior Publication Data

US 2021/0267018 A1    Aug. 26, 2021

(51) Int. Cl.
*H05B 3/60* (2006.01)
*H05B 3/84* (2006.01)
*H05B 3/14* (2006.01)
*H05B 1/02* (2006.01)

(52) U.S. Cl.
CPC ............. *H05B 3/60* (2013.01); *H05B 3/84* (2013.01); *H05B 1/0202* (2013.01); *H05B 3/141* (2013.01); *H05B 3/148* (2013.01)

(58) Field of Classification Search
CPC ..... F24D 13/024; F24D 3/145; H05B 1/0202; H05B 2203/022; H05B 3/06; H05B 3/141; H05B 3/148; H05B 3/50; H05B 3/60; H05B 3/84; Y02B 30/00
USPC ........................................................ 373/121
See application file for complete search history.

(56) References Cited

U.S. PATENT DOCUMENTS

| 2007/0108176 A1* | 5/2007 | Ellis .......................... H05B 3/50 219/228 |
| 2020/0132235 A1* | 4/2020 | Lilleland .................. F16L 53/38 |

FOREIGN PATENT DOCUMENTS

WO    WO2017106599    *    6/2017

* cited by examiner

*Primary Examiner* — Dana Ross
*Assistant Examiner* — Joseph W Iskra
(74) *Attorney, Agent, or Firm* — Husch Blackwell LLP

(57) ABSTRACT

A trench heater includes a case, a connecting unit, and a sub-assembly unit. The sub-assembly unit includes a baffle, a first junction panel, a second junction panel, and an electrical heating unit. The electrical heating unit includes a heating unit that comprises a heating element, a body, and a granular heat transfer medium. Multiple trench heaters may be connected end to end to create longer lengths via a modular platform.

18 Claims, 10 Drawing Sheets

MODULAR PLATFORM ELECTRIC TRENCH HEATER

FIELD OF THE INVENTION

The present disclosure generally relates to electric heater. More particularly, the present disclosure pertains to modular platform electric trench heater.

BACKGROUND OF THE INVENTION

Electric heaters are used in a variety of applications to provide heat by radiation, convection, or conduction. For example, such electric heaters include cartridge heaters, fluid line heaters, and infrared heaters.

A trench heater may be placed next to windows so that the heater may prevent outside air from getting in and conditioned air from getting out. As a result, the heater not only maintains the conditioned space, but also provides additional warm air into the space. To maximize this effect, the trench heater may be placed next to every window and glass door. In some instances, it may be desirable for trench heaters to provide flexible arrangement according to the arrangement of windows.

Such trench heaters may include fluid line radiative heaters. While heat transfer fluid transfers heat generated by a heating source, there are several issues with heat transfer fluid. Specifically, fluid may be leaked to cause property damage and customer dissatisfaction. Fluid line radiative heaters may fail due to incorrect fluid levels. There may be also high scrap rates due to the complex brazing method required to produce the fluid filled radiative heaters. Accordingly, it is desirable to provide an electric trench heater that uses a heat transfer medium other than fluid medium.

SUMMARY OF THE INVENTION

The foregoing needs are met, to a great extent, by the present disclosure, wherein in one respect a modular platform electric trench heater is provided and in another respect a method of making a heating unit for an electric trench heater is provided.

An embodiment of the present disclosure pertains to an electric trench heater. This trench heater includes a case, a connecting unit, and a sub-assembly unit. The sub-assembly unit includes a baffle, a first junction panel, a second junction panel, and an electrical heating unit. The electrical heating unit includes a heating unit that comprises a heating element, a body, and a granular heat transfer medium.

Another embodiment of the present disclosure relates to an electric trench heater. This trench heater includes a first connector to supply power to the electrical heating unit and a second connector to receive power from the electrical heating unit and supply power to another electrical heating unit.

Another embodiment of the present disclosure relates to an electric trench heater. This trench heater includes a wire nut unit connected to the first connector, an optional on/off switch unit to switch the electrical heating unit, a manual reset switch unit, and a protective limit switch unit. The electrical heating unit, the wire nut unit, the manual reset switch unit, and protective limit switch unit are connected to the optional on/off switch unit, and they are independently operable.

Yet another embodiment of the present disclosure relates to an electric trench heater. This trench heater includes a heating element consisting of magnesium oxide, a granular heat transfer medium consisting of sodium silicate and sand, and a body comprising copper, a copper sheathed steel, or stainless steel sheathed steel tube.

Yet another embodiment of the present disclosure relates to an electric trench heater. This trench heater includes a junction end plate to fix the trench heater to another trench heater and a bracket to fix the case to another case.

Still another embodiment of the present disclosure relates to a method of making a heating unit. This method includes providing a tube made of copper, a copper sheathed steel, or stainless steel sheathed steel, placing a heating element in the tube, mixing a mixture of sand and sodium silicate, packing the tube with the mixture, sealing the tube, and heating the mixture to activate the sodium silicate and bind sand.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

The foregoing and other objectives, features, and advantages of the present disclosure will become more apparent from the following detailed description taken in conjunction with the accompanying drawings.

Hereinafter, an apparatus and a method for modular platform electric trench heater according to the present disclosure will be described in detail with reference to the accompanying drawings. The explained embodiments are provided so that those skilled in the art can easily understand the technical spirit of the present disclosure, and thus the present disclosure is not limited thereto. In addition, the accompanying drawings are schematic drawings for easily explaining the embodiments of the present disclosure and thus the matters represented in the accompanying drawings may be different from those actually implemented.

Meanwhile, each component shown below is only an example for implementing the present disclosure. Therefore, other components may be used in other implementations of the disclosure without departing from the spirit and scope of the disclosure.

Besides, it should be also understood that the expression "including" certain elements is an "open type" expression just to say that components exit and do not exclude additional components.

Figure 1:
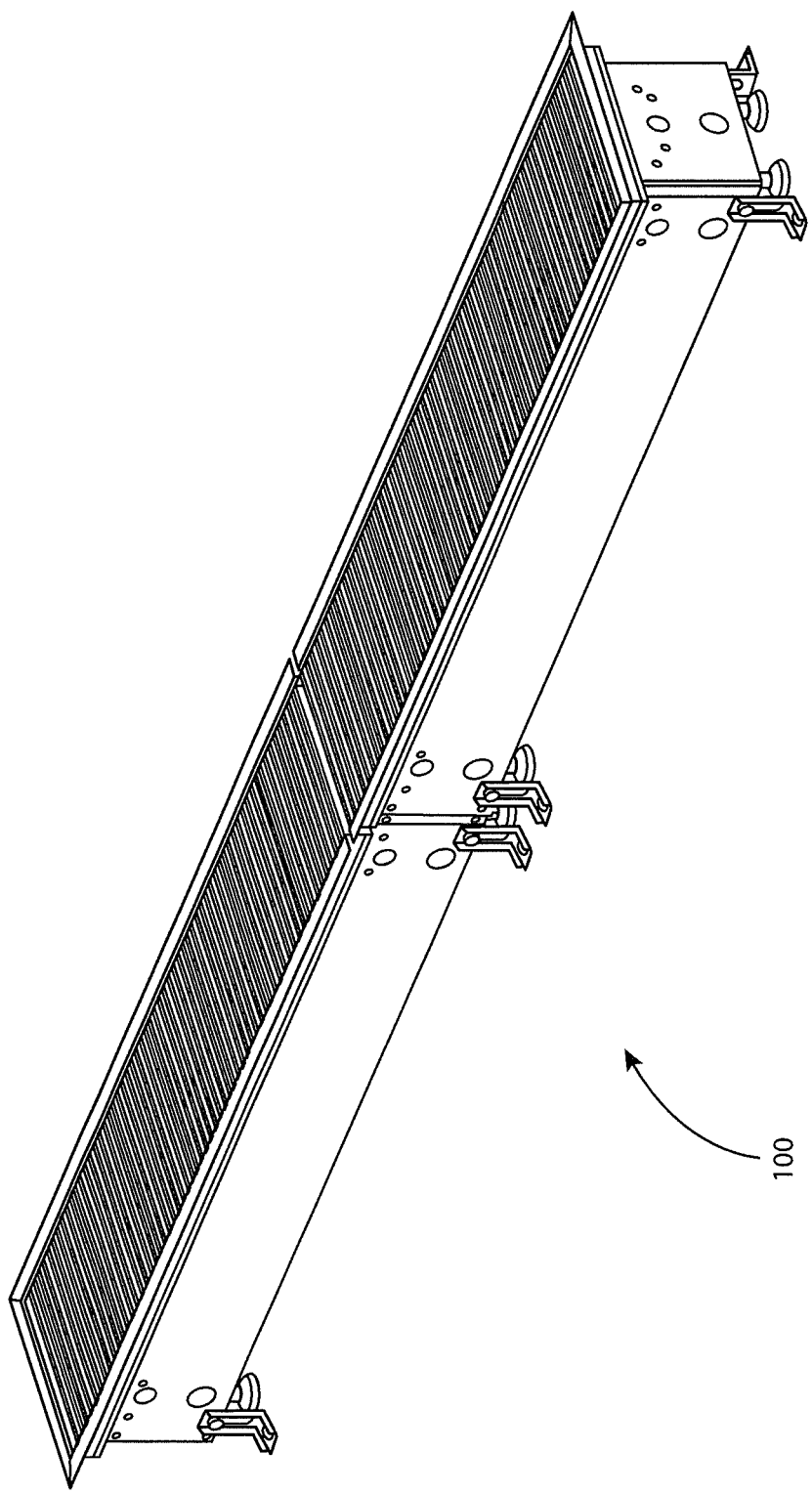
FIG. 1 is a perspective view of a trench heater.

A modular platform electric trench heater 100 will be described with reference to FIGS. 1 to 9. In FIG. 1, a trench heater 100 according to the first embodiment is illustrated. The trench heater 100 is an electric heater that is supplied with power from a power supply such as a battery, power outlet, or power supplied directly via wiring from the building's main electrical supply to generate heat. The trench heater 100 generates heat when supplied with such power. The trench heater 100 radiates the heat primarily in an upward direction.

The trench heater 100 is in the form of a box. As shown in FIG. 1, two trench heaters may be joined with a connecting unit to make a longer trench heater. In this way, a single trench heater may be used as a module to make a desirable configuration. Although the exemplary embodiment in FIG. 1 only shows that two trench heaters are joined in a longitudinal direction, it is noted that two trench heaters may be joined in a perpendicular direction with different connecting unit or may be joined in an angle. It is also noted that more than two trench heaters may be joined so that each adjacent trench heaters joined in either longitudinal, perpendicular, or in angle to make any desirable configuration. Thus, various configurations may be made within the scope that is obvious to a person skilled in the art.

The trench heaters 100 may be installed in an interior of a building such as in the floor next to glass doors or windows. By this, trench heaters may stop cold air from getting in and provide warm air into the house. It may be achieved by placing a baffle inside of the trench heater, and the mechanism of this will be described below in detail with reference to in FIG. 3.

Figure 2:
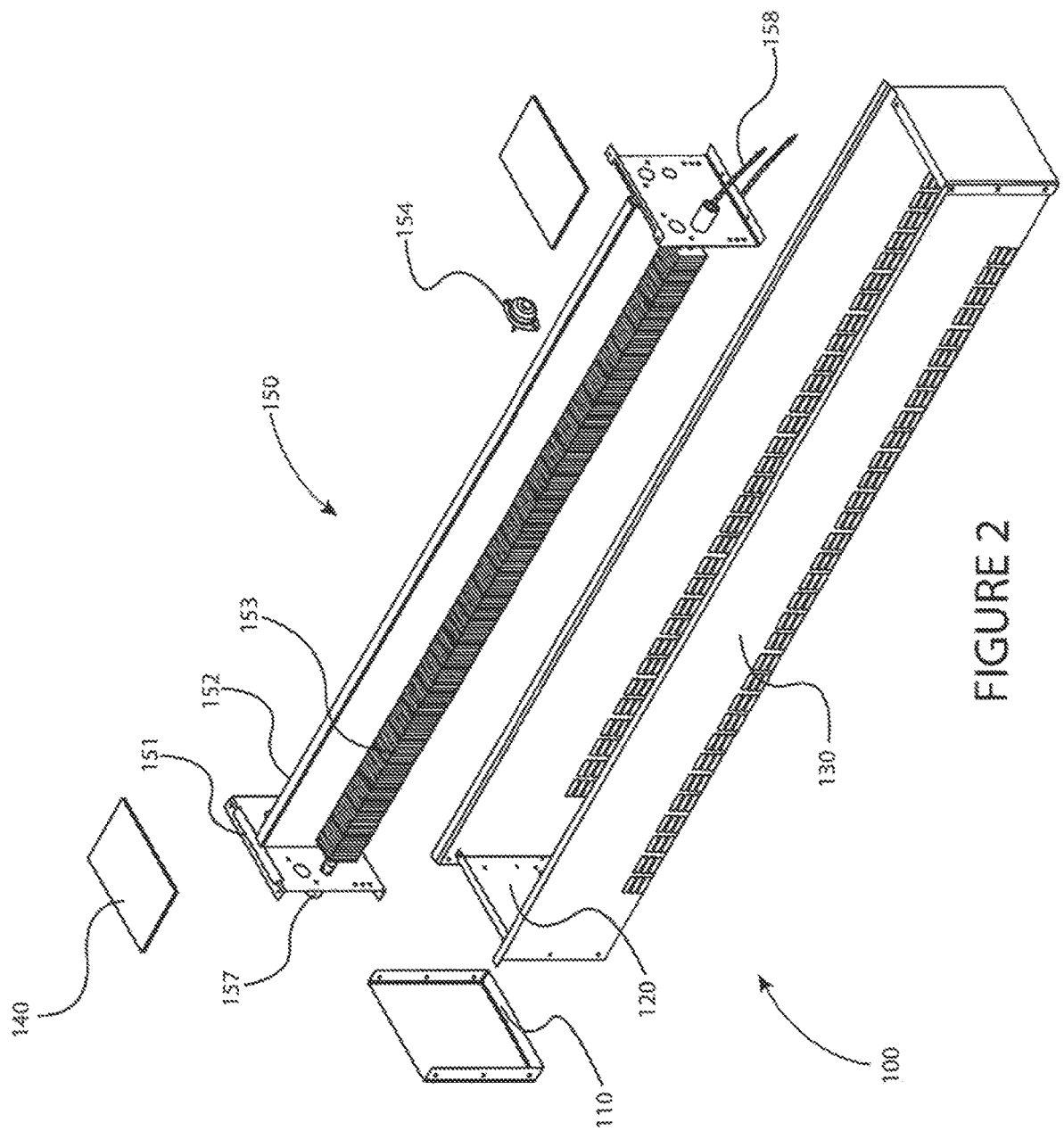
FIG. 2 is a perspective view of a trench heater and associated elements according to an embodiment of the disclosure.
Figure 3:
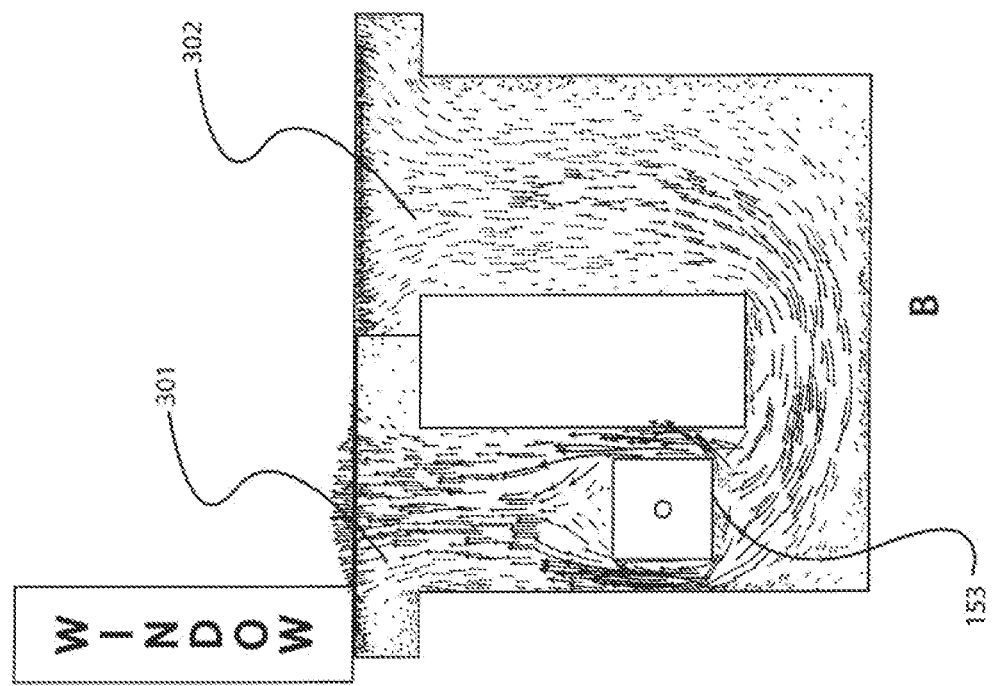
FIG. 3A is a sectional view of a trench heater.
FIG. 3B is a diagram of air flow inside of a trench heater in a sectional view.
Figure 3:
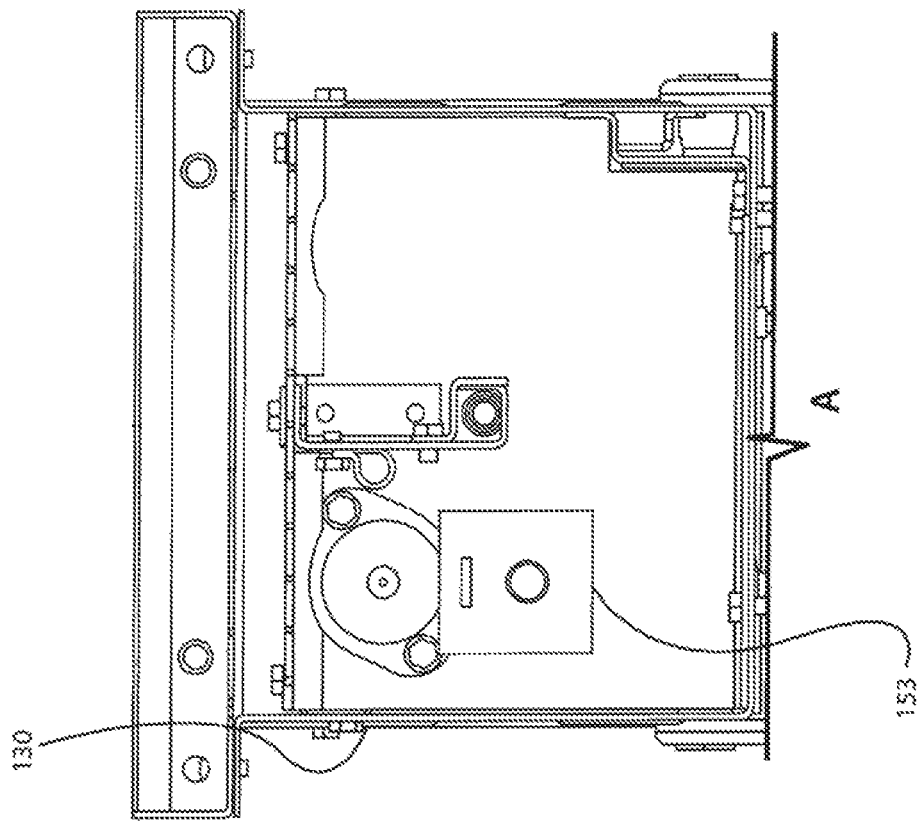

But first, referring to FIG. 2, a trench heater and its associated elements according to an embodiment of the disclosure will be described. A case 130 is provided to fix a sub-assembly 150 and to provide an adequate air flow. At the end of the case 130, a junction end plate 120 is fixed inside of the case 130 to contain electrical wiring and controls. An end cap 110 is installed outside of the case 130 to connect the trench heater 100 to another trench heater 100. It was explained that two trench heaters 100 may be joined with a connecting unit, and the end cap 110 may or may not be installed at the end where two trench heaters 100 are joined.

A sub-assembly 150 is installed inside of the case 130. A baffle 152 is provided to divide the case in a longitudinal direction into two portions, and junction panels 151 are installed on a proximal and a distal end of the baffle 152. The junction panel 151 is configured to fix the sub-assembly 150 to the case 130.

An electrical heating unit 153 is installed in one portion of the case 130 in a longitudinal direction. The electrical heating unit 153 is supplied with power from a power supply (not shown) to a first connector 157 which is attached at one end of the electrical heating unit 153. A second connector 158 is connected to the electrical heating unit 153 at another end of the electrical heating unit 153. The electrical heating unit 153 is wired to return to the other leg of the power supply (not shown) for designed power and heat output. The respective temperature safety controls are installed within this closed circuit. The closed circuit may include an on/off switch, which when in the off position will terminate the flow of electricity to both legs of the electrical heating unit 153 including the temperature safety controls. When two trench heaters 100 are joined, connections are made on electrical power supply lines to route electricity to the second electrical heating unit 153 keeping the second circuit in parallel with the first. This results in both heaters providing designed power and heat output. Connections can be performed during the field installation. The connectors 157, 158 may be configured as a quick connector. The connectors 157, 158 may also be configured to have an error prevention mechanism to prevent the connectors 157, 158 from being installed in a wrong direction. A capillary limit 154 is installed on the electrical heating unit 153, and a junction cover plate 140 is installed on the case 130 on top of the junction panel 151.

It is noted that the baffle 152 does not cover entire height of the case 130 as shown in FIG. 3A. As discussed with reference to FIG. 2, the electrical heating unit 153 is installed in one portion of the case 130. The portion where the electrical heating unit 153 is located may be called as a first portion 301 and the other portion may be called as a second portion 302. It is desirable that the trench heater 100 is installed so that the first portion 301 is adjacent to a window or a glass door.

It will be explained how a trench heater 100 operate with reference to FIG. 3B. When power is supplied through a connector 157 to an electrical heating unit 153, the electrical heating unit 153 will generate heat. As air around the electrical heating unit 153 heated, there will be upward convection current in the first portion 301 of the case 130. As a result, there will be negative pressure below the electrical heating unit 153. As explained earlier, the baffle 152 does not cover entire height of the case 130. Accordingly, there will be downward air flow in the second portion 302 of the case 130. In effect, cold air from a window or a glass door will flow into the second portion 302 of the case, is heated by the electrical heating unit 153, and warm air will be supplied to the room from the first portion 301 of the case 130.

Figure 4:
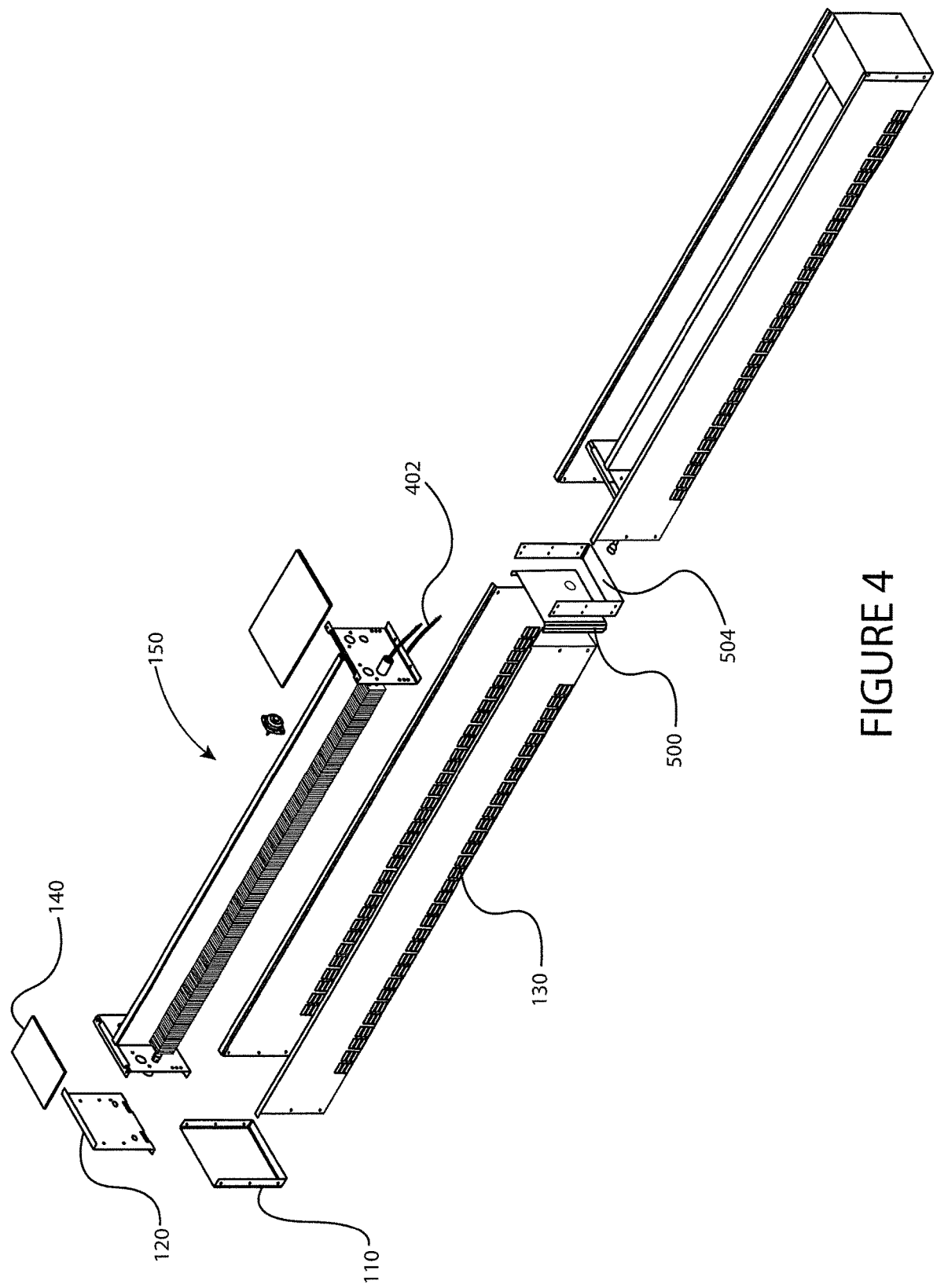
FIG. 4 is a perspective view of a trench heater and associated elements and a connecting unit according to an embodiment of the disclosure.
Figure 5:
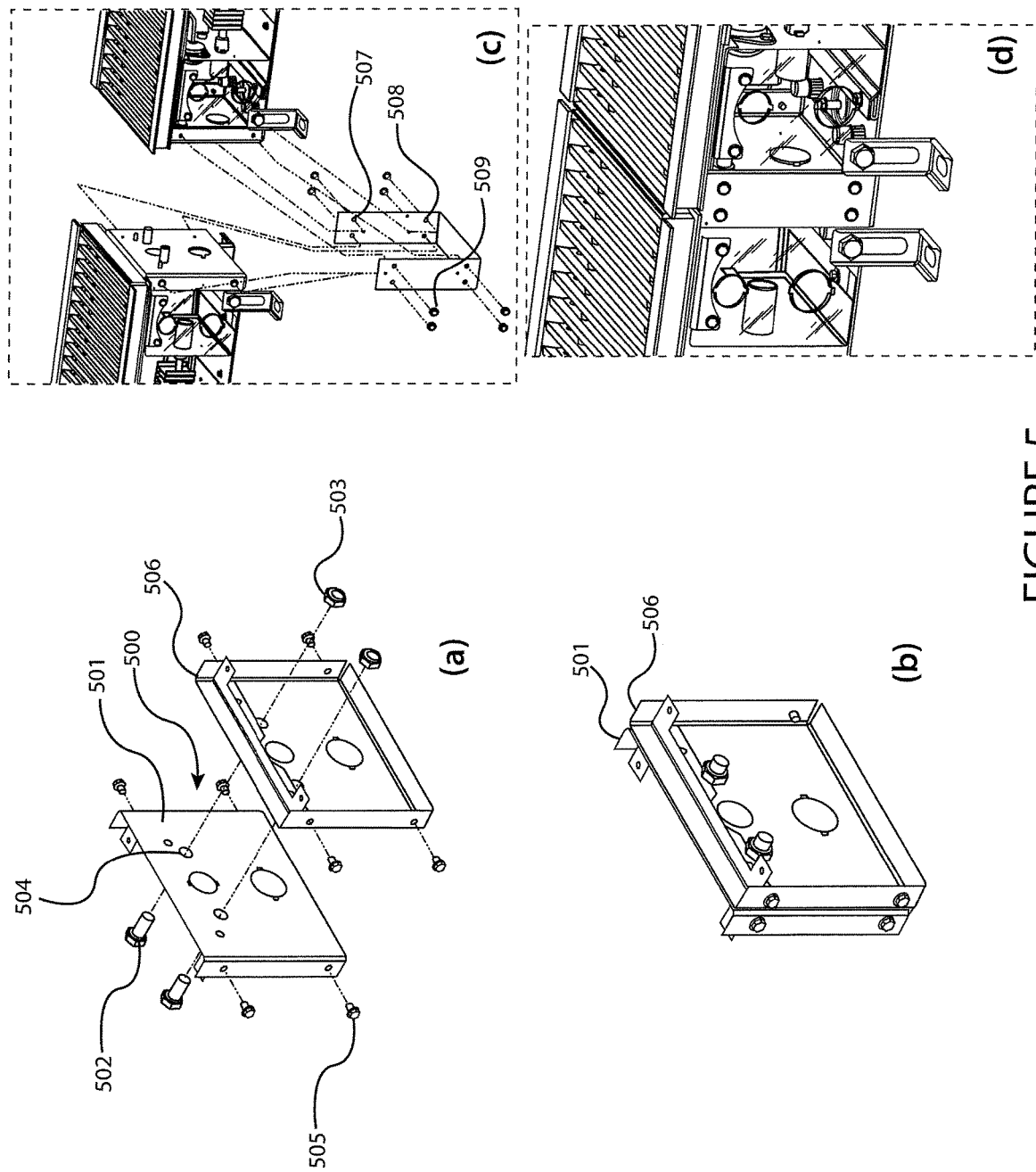
FIG. 5 is a diagram showing some exemplary embodiments of connecting units.

As shown in FIG. 4, two trench heaters 100 may be joined by a connecting unit 500 to provide a flexible arrangement according to the arrangement of windows. In FIG. 5, some exemplary embodiment of connecting units are explained. A connecting unit 500 is provided in FIG. 5A. The connecting unit 500 comprises a connecting plate 501, a connecting bolt 502, a connecting nut 503, a connecting plate bolt hole 504, and a connecting plate fixing bolt 505. A connecting plate 501 is fixed to the case 130 with a connecting plate fixing bolt 505. One or more connecting plate bolt holes are provided on the connecting plate 501, so that one or more connecting bolts 502 may be installed. The connecting plate 501 is configured to connect two trench heaters 100, and the connecting plate 501 is aligned with another connecting plate 506. The connecting bolts 502 may be installed to the aligned connecting plate bolt holes 504, and one or more connecting nuts 503 may be fastened to the connecting bolts 502. As a result, two connected connecting plates 501, 506 are shown in FIG. 5B.

Although the exemplary embodiment in FIG. 5A uses bolts and nuts for the connecting unit 500, it is noted that any plate fixing mechanism may be used, such as bushings. It is also noted that any fixing mechanism may be used to fix the connecting plate 501 to the case 130 to replace connecting plate fixing bolts 505. Thus, various configuration may be made within the scope that is obvious to a person skilled in the art.

With or without the connecting unit 500 described with reference to FIG. 5A and FIG. 5B, a connecting bracket 508 may be used as a connecting unit to fix two trench heaters 100, as shown in FIG. 5C. The connecting bracket 508 may have one or more connecting bracket bolt holes 507 so that one or more connecting bracket bolts 509 may be installed to fix the connecting bracket 508 to the case 130. In case the connecting bracket 508 is installed in addition to the connecting unit 500, the connecting bracket 508 may be installed on the connecting plate 501. The connecting bracket 508 may be a saddle connector. As a result, the connecting bracket 508 fixed to the cases 130 of two trench heaters 100 is shown in FIG. 5D.

Figure 6:
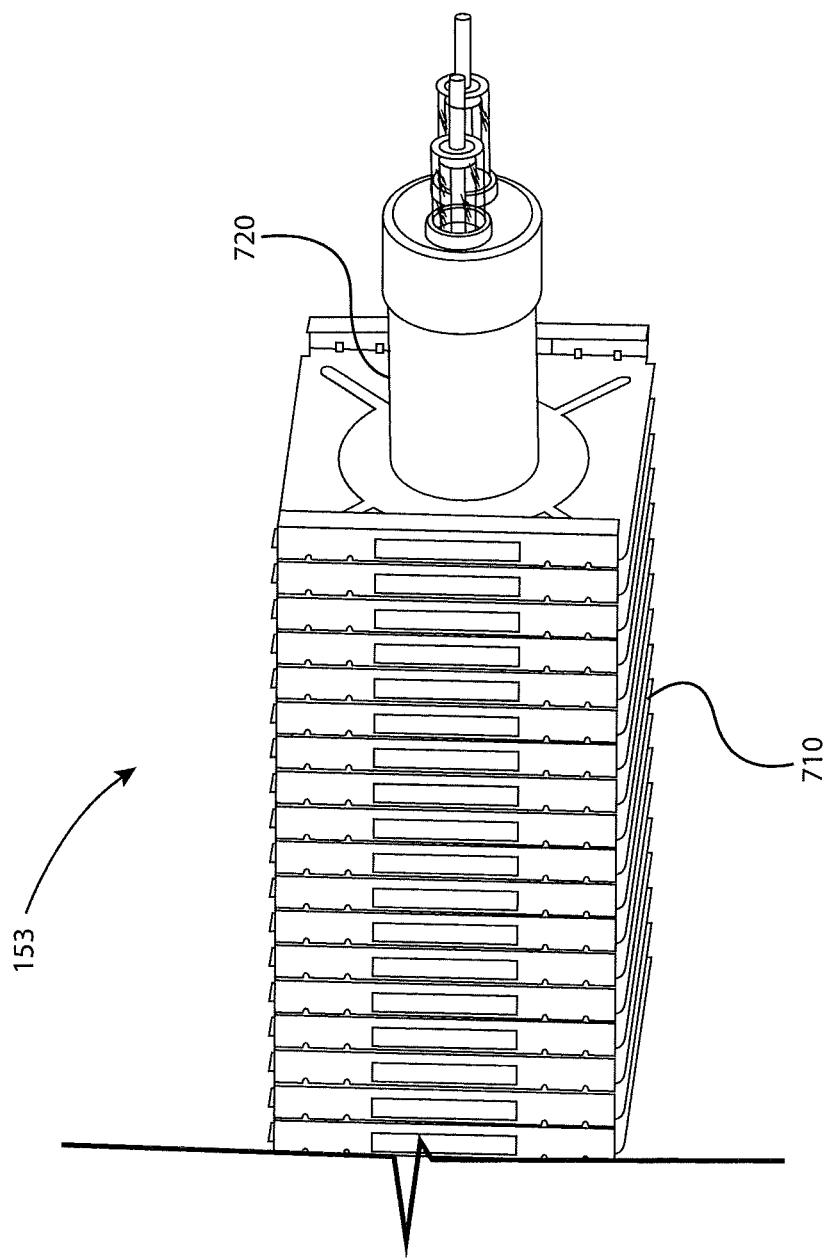
FIG. 6 is a perspective view of an electrical heating unit.
Figure 7:
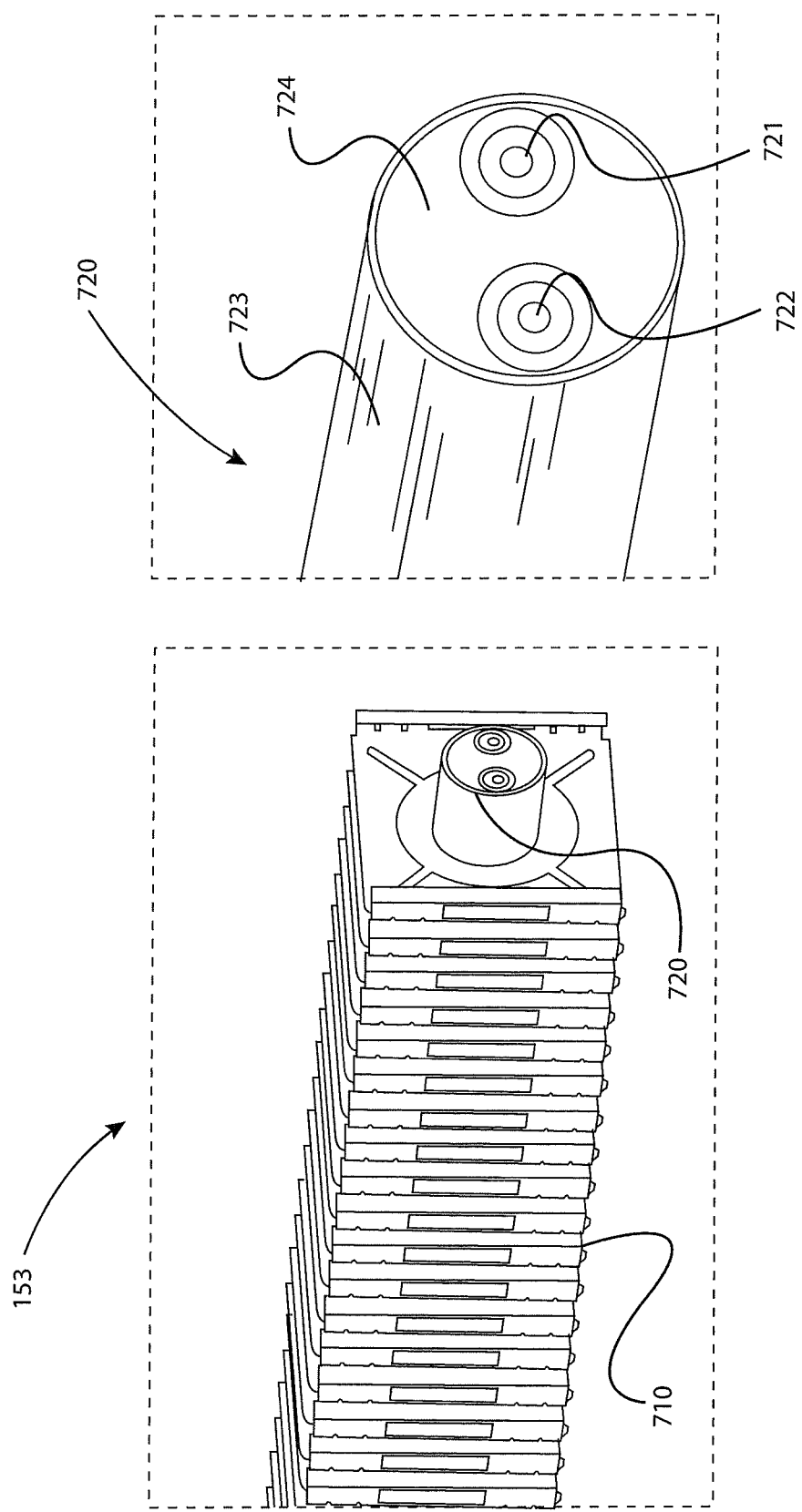
FIG. 7 is a perspective view of an electrical heating unit with a sectional view of a heating unit.

Now, more detailed information on the electrical heating unit 153 will be explained with reference to FIG. 7. FIG. 6 shows a perspective view of an electrical heating unit 153. An electrical heating unit may comprise a heat exchanger 710, which may include a radiator, and a heating unit 720. Traditional heating unit 720 uses heat transfer fluid to transfer heat from a heating element. To prevent issued discussed in the Background section, an exemplary embodiment will be described with reference to FIG. 7.

A heating unit 720 may comprise a heating element 721, a body 723, and a granular heat transfer medium 724. The heating element 721 is located inside of the body 723 and filled with the granular heat transfer medium 724. One or more heating elements 721 may be used for a heating unit 720. When the heating unit 720 is supplied with power, the heating element 721 is heated through the process of Joule heating. Heat generated by the heating element 721 will be transferred to the body 723 through the granular heat transfer medium 724. Because the granular heat transfer medium 724 consists of solid, not liquid, there will be no leak issue. Because there is no leak issue, the electric heating unit 153 will not fail due to incorrect fluid level.

The heating element 721 may be a resistance heating element electrically connected to a power supply to generate heat. The heating element 721 may be made from metal, such as Nichrome (Nickel Chrome alloy), Kanthal (FeCrAl), Cupronickel (CuNi) alloy, or magnesium oxide. The heating element 721 may be in a shape of wire, ribbon, straight, or coiled. The body 723 is a heat conducting material, and is made from metals, such as copper. The granular heat transfer medium 724 is solid heat transfer material, and may be made from sodium silicate, sand, or the mixture of both.

Figure 8:
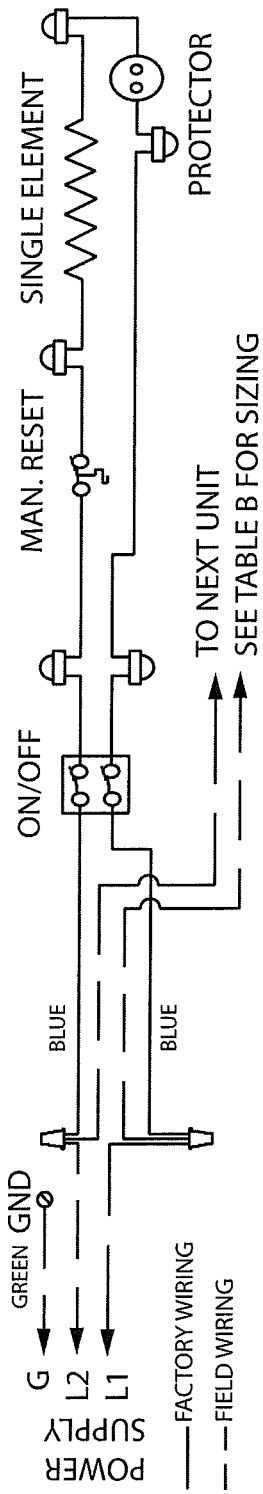
FIG. 8 is a wiring diagram of an electrical heating unit according to an embodiment of the disclosure.

In addition to the heat exchanger 710 and the heating unit 720, the electrical heating unit 153 may comprise additional electrical components. FIG. 8 is a wiring diagram of an electrical heating unit 153 according to an embodiment of the disclosure. Some electrical components of the electrical heating unit 153 may be divided into units. The units may be electrically connected with each other with connectors such that if one unit fails, only that failed unit may be replaced without replacing entire electrical heating unit 153. Connectors between units may be quick connectors. Connectors between units may also have an error prevention mechanism, so that the connectors cannot be connected in a wrong direction. A diagnostic mechanism may be implemented to decide which unit failed in case of the electrical heating unit 153 failure.

Figure 9:
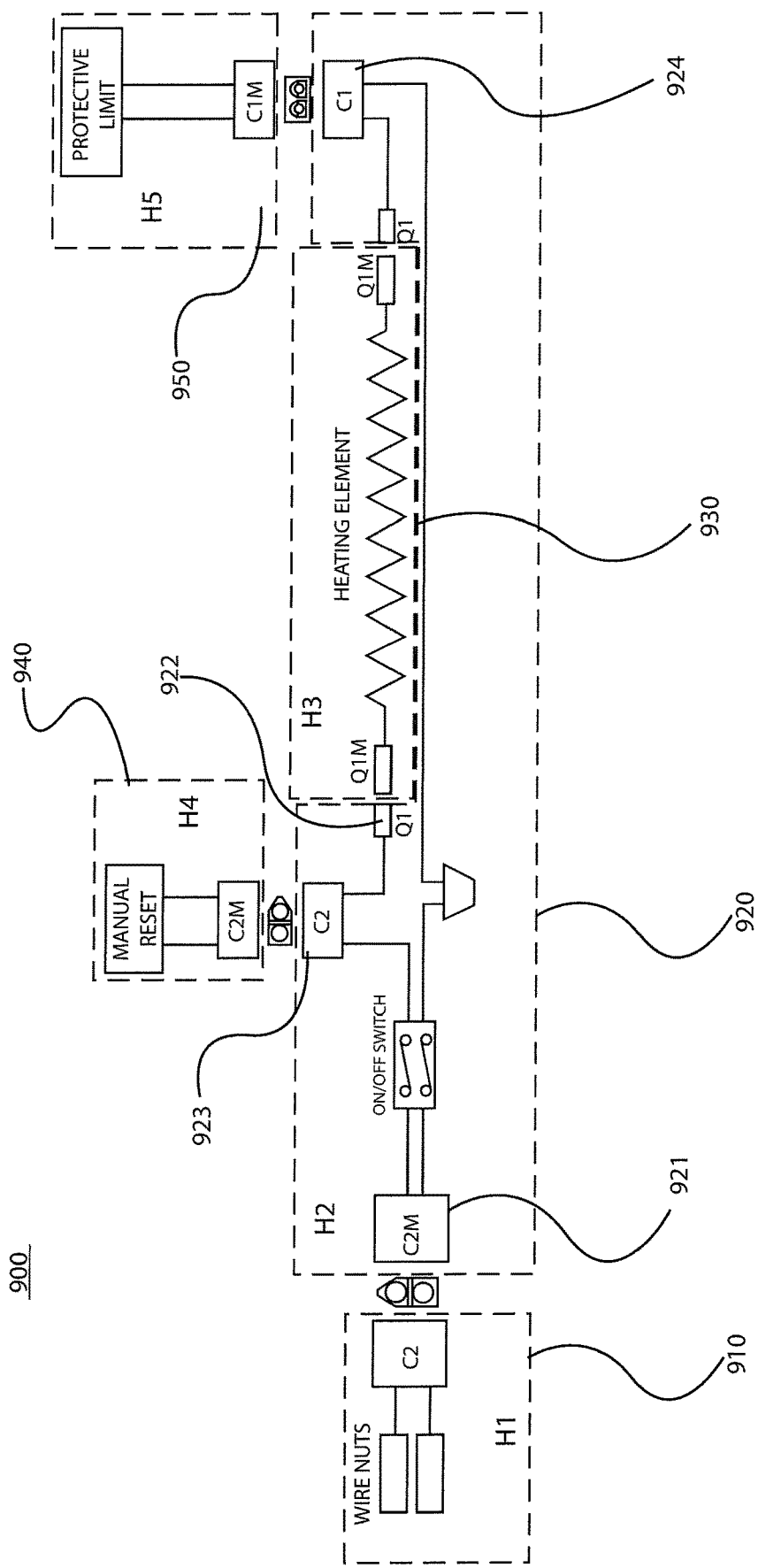
FIG. 9 is a wiring diagram of an electrical heating unit according to another embodiment of the disclosure.

Each unit in the electrical heating unit 153 will be explained with reference to the wire harness configurations in FIG. 9. An exemplary embodiment of an electric component 900 of an electrical heating unit 153 is provided. The electric component 900 of the electrical heating unit 153 in this embodiment comprises a wire nut unit 910, an optional on/off switch unit 920, a heating element unit 930, a manual reset switch unit 940, and a protective limit switch unit 950.

The wire nut unit 910 is located at the end of the electric component 900 of the electrical heating unit 153. The wire nut unit 910 is connected to the connector 157 discussed above and is configured to provide power to the electrical heating unit 153. The on/off switch unit 920 is connected to the wire nut unit 910 with a connector. If included, the on/off switch unit 920 is configured to turn the electrical heating unit 153 on or off. The on/off switch unit 920 is also connected to the heating element unit 930, the manual reset switch unit 940, and the protective limit switch unit 950.

The on/off switch unit 920 may include a mechanism to detect a failed unit in case of the electrical heating unit 153 failure. For instance, the on/off switch unit 920 may have electrical component monitors 921, 922, 923, and 924 to check electric current at each connected point. For example, if there is no electric current detected in the monitor 921, the on/off switch unit may send a signal to a user to inform that the wire nut unit 910 has failed. Likewise, the on/off switch unit may send a signal to a user accordingly if there is no electric current detected in other monitors 922, 923, and 924.

The heating element unit 930 is connected to the on/off switch unit 920. The heating element unit 930 is configured to provide heat in response to power supplied from the wire nut unit 910. The protective limit switch unit 950 is connected to the optional on/off switch unit 920 and is configured to control the electrical heating unit 930. If the protective limit switch unit 950 detects, for instance, high temperature beyond the preset thermal safety limit, the protective limit switch unit 950 will break electrical connection between either the on/off switch unit 920, or the wire nut unit 910, and the heating element unit 930. The protective limit switch unit 950 may be also used to protect users. It may be configured to break electrical connection between the heating element unit 930 and the on/off switch unit 920 when a user opens the trench heater cover. In this case, the protective limit switch unit 950 may use a proximity switch to detect the location of the trench heater cover.

The manual reset switch unit 940 is also provided with electrical connection with the on/off switch unit 920. The manual reset switch unit 940 is configured to break electrical connection with the on/off switch unit 920 or the wire nut unit 910 and the heating element 930 in case there is a problem with the function of the protective limit switch unit 950. Such instance may include when the heating element unit 930 gets too hot due to a faulty thermostat or limit switch failure. When the manual reset switch unit 940 detects temperatures above its preset thermal safety limit, it is configured to break the electrical connection. When the manual reset switch unit 940 breaks electrical connection between the on/off switch unit 920 and the heating element unit 930, a manual reset switch is configured to trip, and a user may push the manual reset switch back to turn the electric component 900 on.

Although it was explained that two trench heaters 100 may be joined with electrical connection with each other, current disclosure is not limited to a series electrical connection. One or more trench heaters 100 may be electrically joined in parallel with corresponding wire nut unit 910 and connector 157 configurations.

Figure 10:
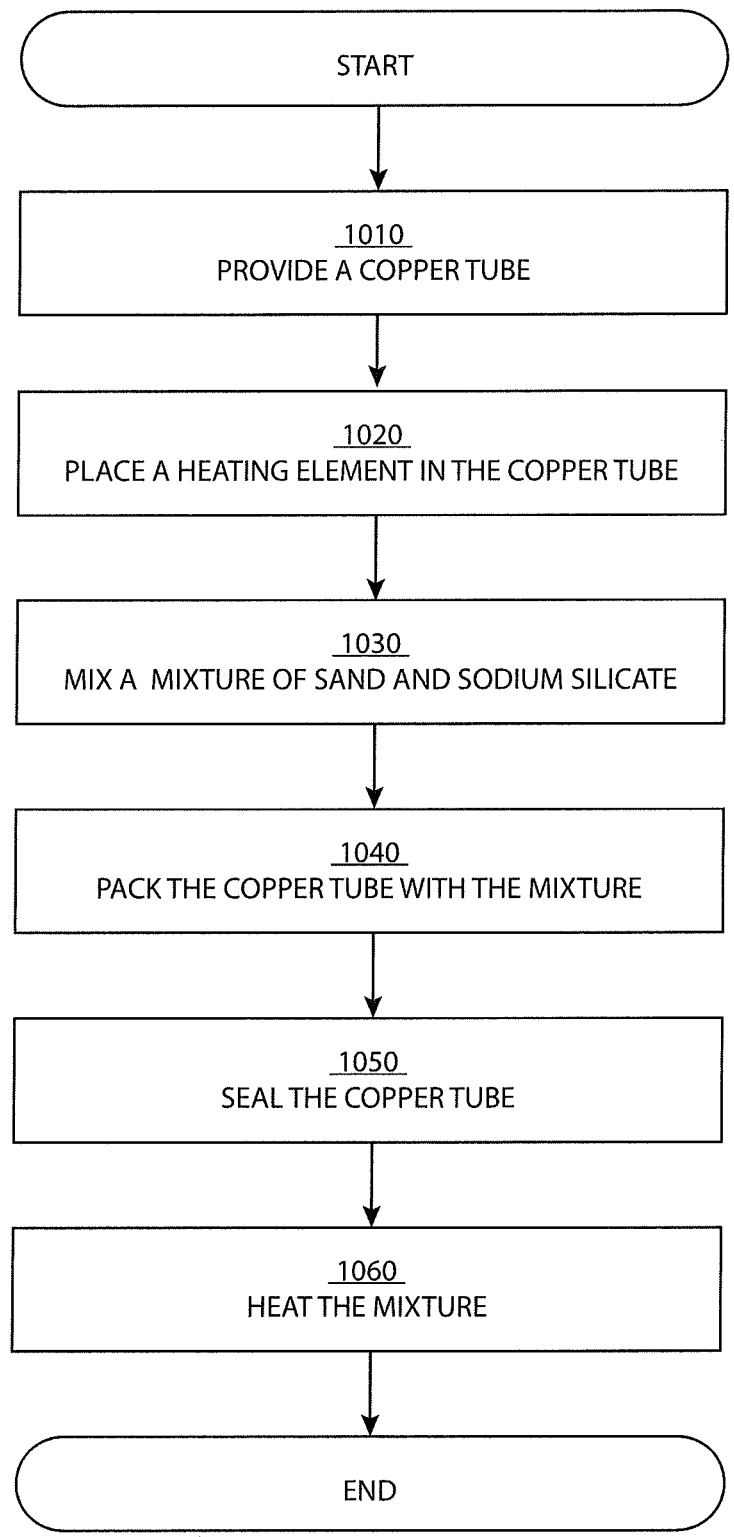
FIG. 10 is a diagram of a method of making a heating unit for an electric trench heater.

Next, a method to make a heating unit for an electric trench heater will be disclosed with reference to FIG. 10. First, in 1010, a tube is provided. The tube may be made from copper, copper sheathed steel, or stainless steel sheathed steel. The tube will preferably have a length shorter than the case 130 and longer than the heat exchanger 710 described above. Then in 1020, a heating element with same or shorter length of the tube is placed in the tube. The heating element may be made of magnesium oxide. One or more heating element may be placed in the tube. Now in step 1030, sand and sodium silicate are mixed. The mixture may be mixed with any conventional method. Sand may comprise fine grade sand, 100 mesh or finer. Sodium silicate may comprise 3-5 wt % of the mixture.

In 1040, the sand and sodium silicate mixture is packed in the tube. In 1050, the tube with the heating element placed and packed with the sand/sodium silicate mixture is sealed. The tube may be sealed with any traditional sealing method, such as welding or putting caps on both sides. Finally, in 1060, the mixture is heated to activate sodium silicate and bind sand. Heating may be performed by the heating element placed in the tube, or by an outside heating source.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A modular platform electric trench heater comprising:
   a case;
   a connecting unit configured to connect said case to another case; and
   a sub-assembly unit located in said case, wherein said sub-assembly unit comprises:
      a baffle having a first end and a second end, wherein the baffle divides said case in a longitudinal direction into a first portion of said case and a second portion of said case;
      a first junction panel configured to fix said sub-assembly unit to said case and fixed to said first end of said baffle;
      a second junction panel configured to fix said sub-assembly unit to said case and fixed to said second end of said baffle; and
      an electrical heating unit located on said first portion of said case comprising a heating unit, wherein said heating unit comprises a heating element configured to radiate heat, a body, and a granular heat transfer medium.

2. The modular platform electric trench heater of claim 1, wherein said electrical heating unit has a first end and a second end, and further comprising:
   a first connector configured to supply power from a power supply to said electrical heating unit and connected to said first end of said electrical heating unit; and
   a second connector connected to a second end of said electrical heating unit and configured to return power to the power supply.

3. The modular platform electric trench heater of claim 2, wherein said electrical heating unit further comprising:
   a wire nut unit in electrical communication with said first connector;
   an on/off switch unit configured to switch said electrical heating unit and in electrical communication with said wire nut unit and said heating unit;
   a manual reset switch unit in electrical communication with said on/off switch unit; and
   a protective limit switch unit in electrical communication with said on/off switch unit,
   wherein said wire nut unit, said on/off switch unit, said heating unit, said manual reset switch unit, and said protective limit switch unit are independently operable.

4. The modular platform electric trench heater of claim 1, wherein said heating element consists of magnesium oxide.

5. The modular platform electric trench heater of claim 1, wherein said granular heat transfer medium consists of sodium silicate and sand.

6. The modular platform electric trench heater of claim 1, wherein said body consists of a copper tube or a steel tube sheathed with copper or stainless steel.

7. The modular platform electric trench heater of claim 1, wherein said connecting unit comprises a junction end plate fixed to said modular platform electric trench heater having a pin and a pin hole wherein said pin is configured to fix to another pin hole in another junction end plate of another connecting unit.

8. The modular platform electric trench heater of claim 1, wherein said connecting unit comprises a bracket configured to connect said case to another case.

9. The modular platform electric trench heater of claim 1, further comprising a junction cover plate.

10. The modular platform electric trench heater of claim 1, further comprising an end cap configured to be installed on a first end of the case at a first end of a trench heater row.

11. The modular platform electric trench heater of claim 2, wherein each of the first connector and the second connector are quick connectors configured to facilitate correct electrical connections.

12. The modular platform electric trench heater of claim 2, wherein each of the first connector and the second connector have an error prevention mechanism.

13. The modular platform electric trench heater of claim 1, further comprising a heat exchanger located outside of said heating unit.

14. The modular platform electric trench heater of claim 1, wherein said heating unit further comprises a second heating element located in said body.

15. The modular platform electric trench heater of claim 3, wherein said on/off switch unit is configured to also control power delivered to another connected electrical heating unit.

16. The modular platform electric trench heater of claim 1, wherein said modular platform electric trench heater is installed such that said first portion of said case is proximal to a window.

17. A modular platform electric trench heater comprising:
   a case having a first height;
   a connecting unit configured to connect the case to another case; and a sub-assembly unit located in the case, wherein the sub-assembly unit comprises:
  a baffle having a first end and a second end, wherein the baffle divides the case in a longitudinal direction into a first portion of the case and a second portion of the case,
    wherein the baffle has a second height less than the first height;
  a first junction panel configured to fix the sub-assembly unit to the case and fixed to the first end of the baffle;
  a second junction panel configured to fix the sub-assembly unit to the case and fixed to the second end of the baffle; and
  an electrical heating unit located on the first portion of the case comprising a heating unit, wherein the heating unit comprises a heating element configured to radiate heat, a body, and a granular heat transfer medium.

18. A modular platform electric trench heater comprising:
a case;
a connecting unit configured to connect the case to another case; and
a sub-assembly unit located in the case, wherein the sub-assembly unit comprises:
  a baffle having a first end and a second end, wherein the baffle divides the case in a longitudinal direction into a first portion of the case and a second portion of the case;
  a first junction panel configured to fix the sub-assembly unit to the case and fixed to the first end of the baffle;
  a second junction panel configured to fix the sub-assembly unit to the case and fixed to the second end of the baffle; and
  an electrical heating unit located on the first portion of the case comprising:
    a heating unit, wherein the heating unit comprises a heating element configured to radiate heat, a body, and a granular heat transfer medium;
    an on/off switch unit configured to turn the electrical heating unit on and off; and
    a protective limit switch unit in electrical communication with the on/off switch unit comprising a mechanism to detect a failure in the electrical heating unit.

\* \* \* \* \*